Dec. 18, 1962 W. K. STEINHAGEN ETAL 3,068,881
MAKE-UP VALVE FOR AIR SYSTEM
Filed Feb. 6, 1959 2 Sheets-Sheet 1
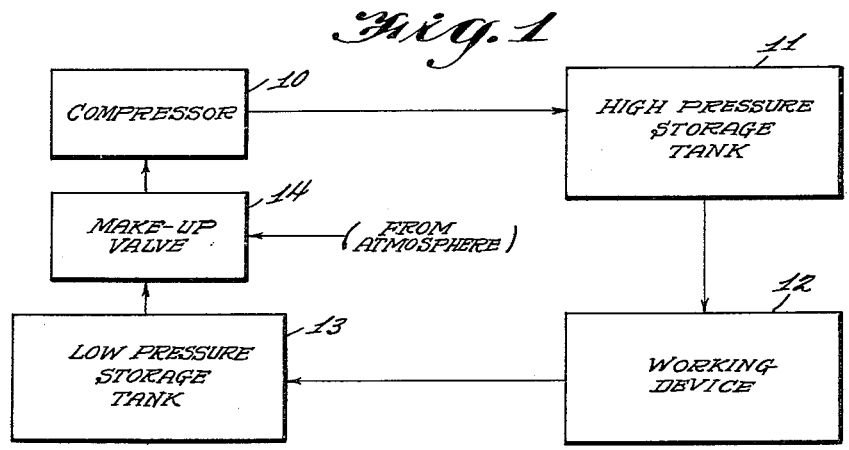
Fig. 1
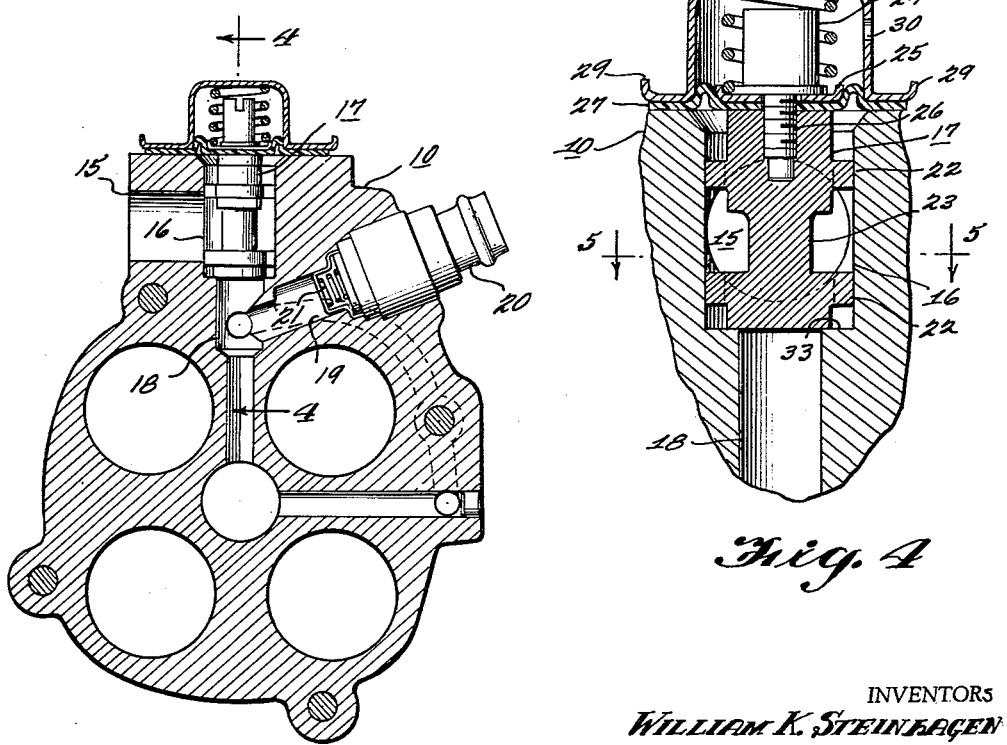
Fig. 3
Fig. 4
INVENTORS
WILLIAM K. STEINHAGEN
RICHARD L. MERRELL
BY S. L. DeMott
ATTORNEY Dec. 18, 1962  W. K. STEINHAGEN ETAL  3,068,881
MAKE-UP VALVE FOR AIR SYSTEM
Filed Feb. 6, 1959  2 Sheets-Sheet 2

INVENTORS
WILLIAM K. STEINHAGEN
RICHARD L. MERRELL
BY H. L. DeMott
ATTORNEY

United States Patent Office 3,068,881
Patented Dec. 18, 1962

3,068,881
MAKE-UP VALVE FOR AIR SYSTEM
William K. Steinhagen, Royal Oak, Mich., and Richard L. Merrell, Simsbury, Conn., assignors to General Motors Corporation, Detroit, Mich., a corporation of Delaware
Filed Feb. 6, 1959, Ser. No. 791,766
2 Claims. (Cl. 137—116)

This invention relates generally to closed type pressurized fluid systems, and more particularly to a make-up valve and valving arrangement for replenishing lost air in such a system.

A closed type pressurized fluid system differs from an open type system in that a low pressure reservoir is provided to receive the discharged fluid from a working device; the fluid is withdrawn by an air compressor and then compressed into a high pressure reservoir for re-use in the working device. On the other hand, in the open type fluid system the compressor continuously draws its fluid from the atmosphere for replenishing the fluid that is vented or exhausted from the working device.

Among the advantages of the closed type system over the open type system are (1) the compressor, working with fluid that is already at a pressure above atmospheric pressure, does not require as much power for raising the pressurized fluid to a higher pressure and thereby is rendered more efficient; (2) the compressor does not have to operate as frequently to maintain a predetermined pressure in the system. While these advantages exist in such a system, some fluid will invariably escape the system either through the compressor, working device, or through the various connections. This fluid loss has a detrimental effect on maintaining a predetermined pressure in the high pressure reservoir required for effectively supplying fluid to the working device.

Accordingly, the objects of the present invention are to maintain the low pressure tank of a closed type pressurized fluid system at predetermined pressure; to admit atmospheric air to the system whenever the tank pressure drops below a predetermined value; to provide a supercharging of the compressor; to prevent the compressor from drawing air from a low pressure tank once the pressure therein falls below a predetermined value; and to provide means responsive to the pressure in the low pressure reservoir for admitting fluid at atmospheric pressure into a closed type pressurized fluid system.

Referring to the drawings wherein like reference numerals refer to like parts, and wherein:

FIG. 1 is a schematic diagram of a system embodying one form of valving arrangement of the present invention;

FIG. 3 is a horizontal sectional view taken on line 3—3 of FIG. 2;

FIG. 4 is an enlarged sectional view taken on line 4—4 of FIG. 3;

Figure 2:
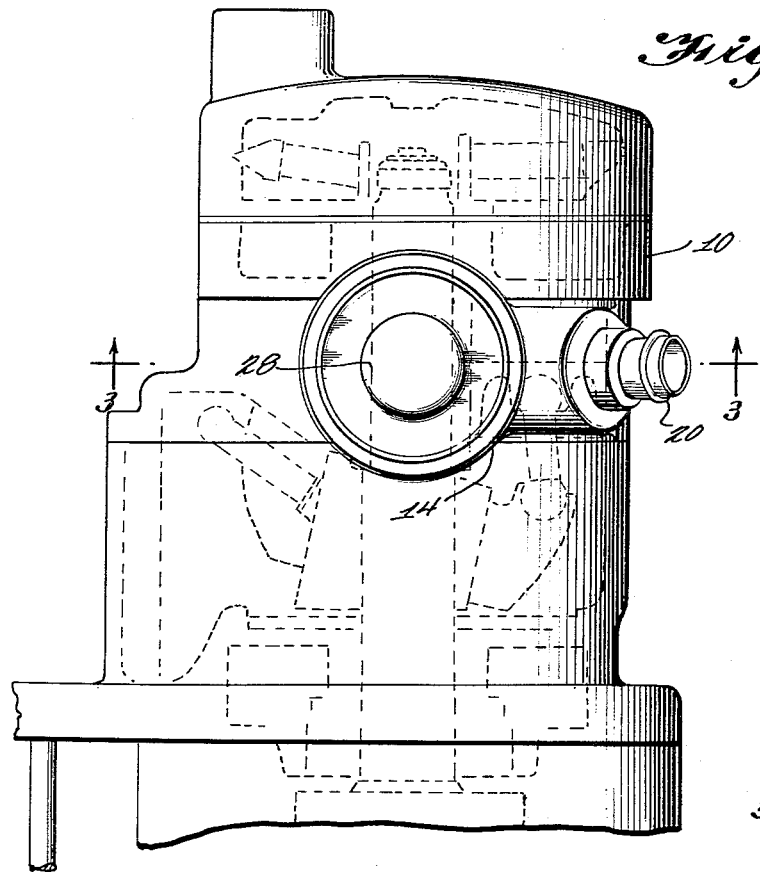
FIG. 2 is an elevation view of a compressor head embodying the valving arrangement of the present invention.

In FIG. 1 of the drawings, the pressurized fluid system embodying the present invention includes a compressor 10, a high pressure storage tank 11, a working device 12, a low pressure storage tank 13 and a make-up valve 14 all connected in series circuit.

The compressor 10 is adapted to draw fluid directly from the atmosphere or through the make-up valve 14 from the low pressure storage tank 13 in a manner that will hereafter be explained. This fluid is then compressed in the compressing chambers of the compressor 10 and pumped through a connecting conduit to the high pressure storage tank 11. A working device 12, such as a pressurized fluid-operated brake or spring, is operatively connected to the high pressure storage tank 11 and receives pressurized fluid therefrom. Fluid that is exhausted from the working device 12 during operation thereof is not lost to the atmosphere, as in an open type system, but directed through a suitable connection to the low pressure storage tank 13, wherefrom the fluid is then made available to the compressor 10 for re-use by the make-up valve 14.

While the compressor and make-up valve are shown as separate elements in FIG. 1, they may be combined into a single unit as illustrated in FIG. 2. The compressor 10 may be of a well known wobbler type compressor having the make-up valve 14 housed therein. The mechanism of the compressor 10 is outlined by dotted lines; however, no portion thereof is encompassed in the present invention; consequently, a detailed description is omitted.

Referring now to FIG. 3, an air inlet port 15 is provided in the head of the compressor 10 and receives fluid from the low pressure tank 13. A bore or chamber 16 having its longitudinal axis normal to the axis of the inlet port 15 is also provided in the housing of the compressor 10 and intersects the inlet port 15. The bore 16 has a spool valve 17 positioned and slidably movable therein. The bore 16 communicates with a passage 18 that is axially aligned with the bore and that leads to the compressing chamber of the compressor. A further passage 19 provides communication between passage 18 and the atmosphere. The passage 19 is provided with an enlarged end portion having seated therein an air cleaner 20 incorporated with a conventional check valve that is normally maintained closed by a spring 21. The cleaner 20 filters any air being admitted to the compressor therethrough.

A detailed drawing of the valving mechanism that is employed in the present invention is shown in FIG. 4. The valve mechanism shown comprises the spool valve 17 which is substantially cylindrical in shape and has enlarged portions 22 and reduced portions 23. A retaining member consisting of a head portion 24, washer 25 and a threaded stud 26 attached to the head 24 is fixedly attached to the spool valve 17. This retaining member serves to fixedly secure a diaphragm 27 to the valve 17. An enclosure 28 having outwardly extending flanges 29 encloses the retaining means. A vent 30 is provided in the enclosure 28 to maintain the air therein at atmospheric pressure. The flanges 29 of the enclosure member 28 are adapted to compress the extremities of the diaphragm 27 to the housing of the compressor 10 and thereby restrict any movement of the outer edges of the diaphragm 27. Fastening means for securing the enclosure flanges 29 to the compressor 10 are not shown but can be of any suitable type. A helical spring 32 is positioned within the enclosure 28 so as to surround the head 24 of the retaining means. One end of the spring 32 abuts the roof of the enclosure member 28, while the other end seated on the washer 25 biases the valve 17 against the seat 33 to close off the passage 18 and prevents communication between the inlet port 15 and the passage 18.

Figure 5:
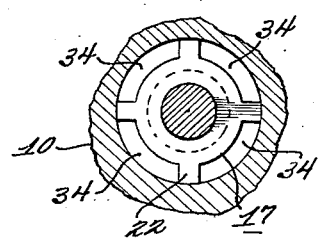
FIG. 5 is a sectional view taken on line 5—5 of FIG. 4.

The enlarged portions 22 on the valve body 17, which can be seen more clearly in FIG. 5, serve to guide the valve within the bore 16 of the compressor head. Passages 34 are provided between the enlarged portions 22 so as to permit the pressurized fluid entering into the compressor 10 from the low pressure tank 13 through the fluid inlet port 15 to be directed to the under side of the diaphragm 27 and to the area adjacent the valve seat 33.

The operation of the valving arrangement illustrated in FIGS. 1 to 5 is as follows: Assuming the system is first to be charged with fluid, the valve spool 17 is in a seated position due to the fact that the force being exerted by the spring 32 on the washer 25 is greater than the force exerted on the diaphragm 27 by the fluid in inlet 15. Accordingly, the passage 18 to the compressing chamber of the compressor 10 is closed. Consequently, operation of the compressor will establish a suction pressure which is sufficient to overcome the force of the spring 21 of the check valve and thereby admit fluid from the atmosphere to the compressing chambers of the compressor 10 via the passage 19. The compressor 10 will draw the fluid from the atmosphere through the check valve, compress it in the compressing chambers, and discharge it at a higher pressure to the high pressure storage tank 11 through a connecting conduit. The operation of the compressor 10 will continue in this manner until the high pressure tank 11 attains a predetermined pressure. Then a governing device, which is not shown, will automatically discontinue operation of the compressor 10. Upon filling of the high pressure storage tank 11 with a fluid at a predetermined pressure, the working device 12 that is connected through a conduit to the high pressure tank 11 and that draws its fluid therefrom will then be rendered operative. During operation of te working device 12, fluid that is exhausted therefrom will be directed by means of a conduit to the low pressure tank 13. The operation of the system will continue as above enumerated until the low pressure tank 13 attains a predetermined pressure above atmospheric pressure.

It should be kept in mind that due to the connection between the low pressure tank 13 and the compressor 10, the pressure in the low pressure tank 13 will also be the pressure in the inlet 15 of the compressor 10 and will be in communication with the diaphragm 27 of the valving arrangement. The pressurized fluid from the low pressure tank 13 will tend to lift the diaphragm 27 upward, thereby carrying the attached valve body 17 in the same direction with it. At the same time the spring 32 tends to prevent opening of the valve.

Once the pressure from the low pressure tank 13 attains the predetermined value, this pressure will overcome the force of the spring 32 and the valve body 17 will snap open, thereby establishing communication between the low pressure tank 13 and the working chamber of the compressor 10 by means of the conduit 18. The pressure in the low pressure tank 13 being at a pressure greater than atmospheric and well above the suction pressure of the compressor 10 will then cause the check valve to close. At this time, any air being drawn by the compressor 10 will be supplied by the low pressure storage tank 13 to supercharge the compressor 10 and to permit the compressor to pump the fluid into the high pressure tank 11. After continuous operation in this manner, any fluid loss from the system due to leakages will have the effect of dropping the pressure in the low pressure tank 13 below a value sufficient to maintain the valve body 17 open against tthe spring 32. When this occurs the spring 32 will urge the valve body 17 downwardly to a seated position, resulting in a blocking of the inlet port 18, and once again the compressor 10 will draw fluid from the atmosphere through the check valve until the lost fluid is replenished and the low pressure tank 13 again attains the predetermined pressure required for opening the valve body 17 to establish communication between the low pressure tank 13 and the compressor fluid inlet port 15

Figure 6:
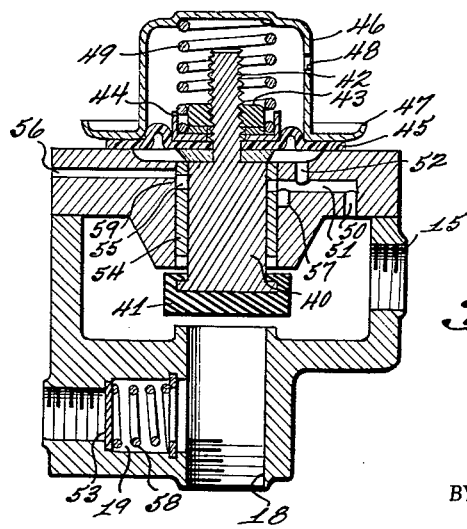
FIG. 6 is a sectional view of a further embodiment of the present invention.

A modification of the valve mechanism that is incorporated in the subject invention is shown in FIG. 6. This modification is adapted to admit pressurized fluid into the compressor 10 at a predetermined pressure of the low pressure storage tank, or when the pressure in the tank s within a predetermined range of values, and to permit fluid at atmospheric pressure to enter the compressor when the pressure in the low pressure tank falls below the predetermined range of values. In addition, this modification is adapted to prevent the pressurized fluid in the low pressure storage tank from attaining a pressure substantially above the predetermined range of values. This is accomplished by the provision of passages in the valve mechanism housing that cooperate with a ported cylindrical sleeve that is fixed to and slidably movable with a valve body so as to control communication between the low pressure tank and the atmosphere.

The modification comprises a valve body 40 having a resilient seating member 41 attached thereto. A threaded stud member 42 extends longitudinally from the valve body 40 and is adapted to receive a nut 43 thereon. A spring retaining washer 44 is interposed between the nut 43 and the valve body 40 and is adapted to securely fix the diaphragm 45 to the valve body upon proper tightening of the nut 43. An enclosure 46, having a configuration similar to the enclosure of the previously described valve mechanism, is provided with a flange portion 47 that is adapted to restrict movement of the outer extremities of the diaphragm 45 and also has a vent 48 to atmosphere provided therein. A spring 49 interposed between the enclosure 46 and the washer 44, as in the prior valve, maintains the valve body 40 in a seated position and thereby closes the passage 18. A port 15 is provided for admitting pressurized fluid from the low pressure reservoir to a chamber adjacent the seating member 41. Passages 50, 51 and 52 are provided to convey the pressurized fluid from the chamber to the under sides of the diaphragm 45. Passage 51 also leads to an enlarged opening 57 adjacent an annular groove 55 in a sleeve 54 and is adapted to supply fluid to the groove for purposes that will hereafter be explained. The cylindrical sleeve 54 surrounds the valve body 40 and is adapted to fixedly ride therewith. The annular groove 55 about the outer periphery of the sleeve 54 is capable of establishing communication between the passage 51 leading from the low pressure storage tank 13 and a passage 56 that leads to the atmosphere. The passage 56 is positioned in a plane parallel to and slightly above that of passage 51 so that communication therebetween is not permitted until the annular groove 55 of the sleeve 54 is raised above the longitudinal axis of the passage 51.

A check valve 53 slidably mounted in passage 19 is biased to a closed position by a spring 58 for purposes of admitting fluid from the atmosphere to the compressor chamber through the passage 18.

The operation of the subject modification is similar to that of the previously described valving mechanism. Pressurized fluid from the low pressure tank is admitted into the chamber adjacent the seating member 41 through the port 15. This fluid is then supplied to the under sides of the diaphragm 45 by the passages 50, 51, 52 and tends to raise the diaphragm upwardly. The spring 49 prevents the raising of the diaphragm and attached valve body 40 until the pressure of the fluid overcomes the force of the spring. Assuming the pressure of the fluid being directed to the valve mechanism from the low pressure tank, for example, is at 43 pounds per square inch (p.s.i.) and the predetermined pressure required to overcome the force of the spring is 45 p.s.i., the valve 40 will remain seated to close port 18 until this latter pressure is attained. Once the predetermined pressure is reached, the valve 40 will be sufficiently raised to uncover the port 18. At this time the fluid from the low pressure tank will be directed to the working chamber of the compressor via the port 18. At the same time the pressurized fluid will act on the valve 53, maintaining it closed to the atmosphere.

If the fluid from the low pressure tank should rise above the 45 p.s.i. required to unseat the valve 40, this additional pressure would have a tendency to raise the valve further from its seat. However, to prevent the pressure from increasing beyond a predetermined value, the bleed passage 56 to atmosphere is provided. Communication between the passage 51, which is at the pressure of the low pressure tank, and the bleed passage 56 is established by the annular groove 55 in the sleeve 54 carried by the valve body 40. Consequently, as the pressure in the low pressure tank increases beyond 45 p.s.i. this excessive pressure will urge the valve body 40 and its attached sleeve 54 upwardly until it reaches a position where groove 55 establishes communication with the passage 56. Excessive pressure will then be exhausted to atmosphere via passage 51, opening 57, groove 55, and passage 56. As the pressure in the low pressure tank decreases due to the bleeding off of the excessive pressure, the valve body 40 will tend to be lowered by the spring 49 until the groove 55 is blocked from communication with passage 56 by the wall 59. Should the pressure in the low pressure tank continue to decrease to a value below 45 p.s.i., the spring 49 will urge the valve body downwardly sufficiently to close the port 18 and thereby discontinue the supply of pressurized fluid to the compressor. As in the previously described valving mechanism, the compressor's suction pressure will cause the check valve 53 to open to admit fluid at atmospheric pressure to the compressor.

It is obvious that various changes may be made in details within the scope of our claims without departing from the spirit of our invention. It is, therefore, to be understood that our invention is not to be limited to the specific details shown and described.

What is claimed is:

1. A pressurized fluid supply system comprising a compressor, a low pressure tank, and a valve assembly for alternately connecting the inlet of said compressor to atmosphere and to said low pressure tank, said valve assembly comprising a valve housing having a chamber therein, first passage means in said housing connecting the inlet of said compressor to said chamber and said low pressure tank, second passage means in said housing connecting said chamber directly to the atmosphere and a valve responsive to the pressure in said low pressure tank mounted for movement within said chamber, a diaphragm secured to said valve for actuating said valve, one surface of said diaphragm being exposed to the atmosphere and the other surface exposed to the pressure in said low pressure tank, a spring assembly engaging said surface of said diaphragm which is exposed to the atmosphere and urging said valve in a direction to bias said valve against said pressure of said low pressure tank, said valve being cylindrical in shape and having a cylindrical sleeve surrounding said valve and adapted to fixedly ride therewith, and an annular groove about the outer periphery of said sleeve for establishing direct communication between said chamber and the atmosphere, said valve being movable between a first position at which said valve closes said first and second passage means when the pressure within said low pressure tank falls below a predetermined range of values, an intermediate position at which said first passage means is open and said second passage means is closed when the pressure within said low pressure tank is within said range of values and a third position at which said first and second passage means are open when the pressure within said tank rises above said range of values, said valve means including means being adapted to close said second passage means during the movement from said third position to said intermediate position while maintaining said first passage means open.

2. A pressurized fluid supply system as set forth in claim 1 wherein a further passage means connects said first passage means to atmosphere and wherein a valve responsive to the pressure difference between atmosphere and the pressure in said first passage beans normally maintains said further passage means closed when the pressure in said low pressure tank is within the above said predetermined range of values.

References Cited in the file of this patent

UNITED STATES PATENTS

| | | |
|---|---|---|
| 685,704 | Wilkinson | Oct. 29, 1901 |
| 1,999,697 | Kleckner | Apr. 30, 1935 |
| 2,070,411 | Powers | Feb. 9, 1937 |
| 2,177,082 | Staaff | Oct. 24, 1939 |
| 2,290,080 | Wahlmark | July 14, 1942 |
| 2,848,249 | Bertsch | Aug. 19, 1958 |
| 2,862,725 | Jackson | Dec. 2, 1958 |